Feb. 7, 1950 R. H. DICKE 2,496,521

SINGLE SIDE BAND MODULATION SYSTEM

Filed May 23, 1945 2 Sheets-Sheet 1

INVENTOR.
ROBERT H. DICKE
BY William D. Hall
ATTORNEY

SINGLE SIDE BAND MODULATION SYSTEM

Filed May 23, 1945 2 Sheets-Sheet 2

*INVENTOR.*
ROBERT H. DICKE
BY William D. Hall.
*ATTORNEY*

Patented Feb. 7, 1950

2,496,521

UNITED STATES PATENT OFFICE 2,496,521

SINGLE SIDE BAND MODULATION SYSTEM

Robert H. Dicke, Cambridge, Mass., assignor, by mesne assignments, to the United States of America as represented by the Secretary of War Application May 23, 1945, Serial No. 595,359

9 Claims. (Cl. 332—45)

This invention relates to communication systems and more particularly to systems involving the use of single sideband modulation and transmission.

According to conventional theory, when energy waves of two frequencies are combined to produce an amplitude-modulated wave, the resultant signal contains components at new frequencies. These new frequencies include the sum and difference of the two original frequencies, the signal components at these frequencies being known as sidebands. Several distinct advantages have led to the use of single sideband transmission in which either the sum or the difference frequency component is eliminated. Increased ratio of power in the sideband to carrier power and narrower band width are important advantages. Narrower band width makes possible a higher signal-to-noise ratio and improved intermediate-frequency amplifiers in the receiver. One very great disadvantage however has been encountered. The equipment necessary for sideband elimination was extensive in both transmitter and receiver. Highly selective tuned circuits were involved, and even then it was not possible to obtain a sharp distinction between two frequencies which were very close to each other.

Many distance measuring devices for airplanes and other vehicles have been made using frequency modulation and the Doppler effect. However, because of the difficulty of separating waves of two frequencies which are close together, such devices were not as desirable as could be expected.

An object of the present invention is, therefore, to provide a novel system for combining two frequencies to produce either or both single sidebands.

A further object of the present invention is to provide a system for combining either sideband with local oscillations to produce a single sideband of an intermediate-frequency signal.

Another and still further object of this invention is to provide a system for combining a signal containing both sidebands with local oscillations to produce either sideband of signal.

In accordance with the present invention there are provided two mixers or converters connected to the symmetrical branches of a T-bridge or magic-T. The electrical distances of the two mixers from the electrical center of the magic-T differ by an odd number of eighth wavelengths. The mixers are separated at the intermediate frequency by an electrical distance of an odd number of quarter wavelengths by means of a delay circuit. The mixer which is farther from the electrical center of the magic-T is connected a source of modulating voltage. One of the asymmetrical branches of the magic-T connects to a local source of radio-frequency energy. This branch also contains an absorptive load. The remaining asymmetrical branch of the magic-T connects to a load.

Figure 1A:
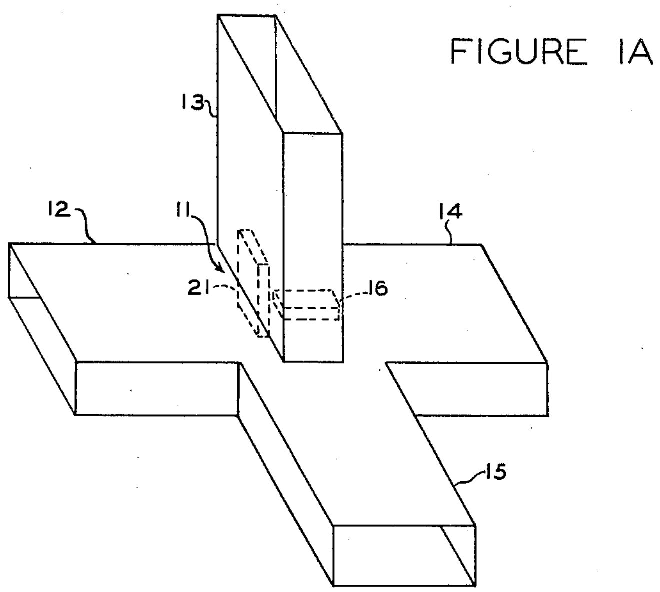
Figure 1B:
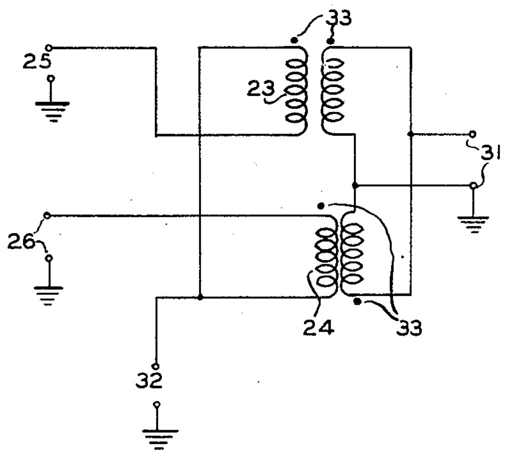
Figure 3:
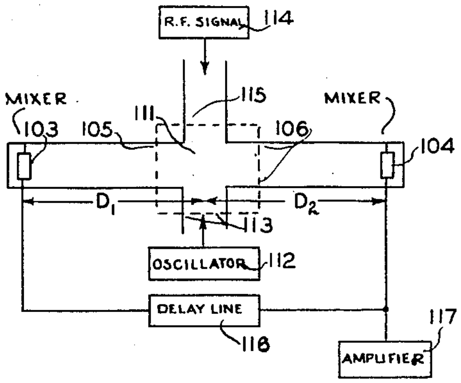
Figure 2A:
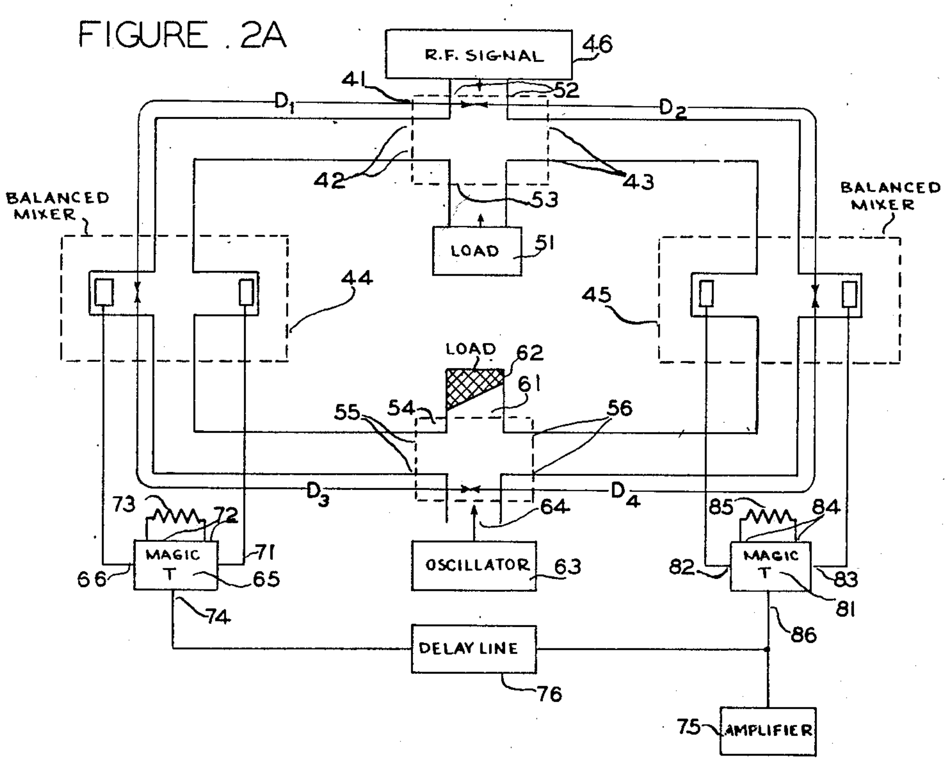
Figure 2B:
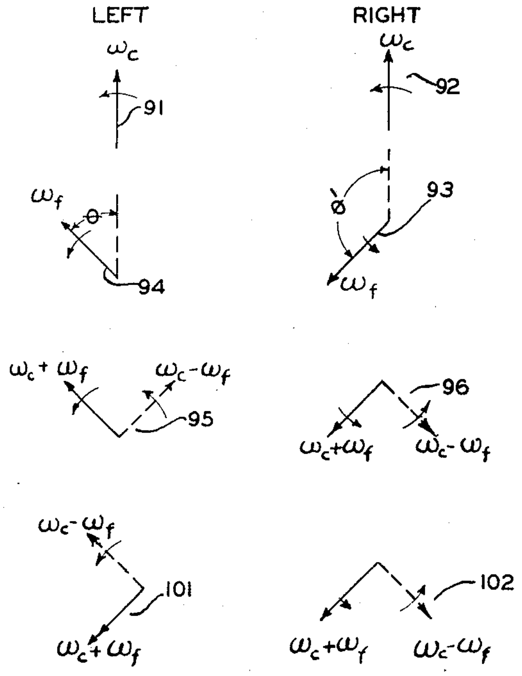

For a better understanding of the invention, together with other and further objects thereof, reference is had to the following description, taken in connection with the accompanying drawings in which:

Fig. 1A is a perspective view showing the preferred embodiment of the magic-T in wave guide form and Fig. 1B shows schematically the electrical equivalent at lower frequencies;

Fig. 2A is a partially schematic view of an embodiment of the invention which may be used to produce either or both sidebands as a single sideband modulator or to demodulate either sideband, while Fig. 2B shows a vector analysis of one of the modes of operation of the apparatus of Fig. 2A; and Fig. 3 schematically illustrates another embodiment of the invention which may be used to produce or demodulate either sideband.

Referring now more particularly to Fig. 1A, there is shown a magic-T 11 in wave guide form. The magic-T 11 comprises branches 12, 13, 14 and 15. To form the magic-T 11, the branches 12 to 15, inclusive, have the following relationship. The axes of the four branches meet at a common junction. A first and a second of these branches are symmetrical with respect to a plane which passes through the axes of the third and fourth branches and which plane is also perpendicular to the electric lines of force within one of the third and fourth branches. Further, the third and fourth branches are so disposed that the electric lines of force therein are mutually perpendicular. In the preferred embodiment the axes of the first and second branches are colinear and the axes of the third and fourth branches are mutually perpendicular to each other and to the axes of the first and second branches. The exact form of T-bridge illustrated and the designations of branch numbers are for purposes of explanation only and are not to be taken as any limitation of the invention herein described. The magic-T 11 also includes irises or curtains 16 and 21. The irises 16 and 21 are so arranged at the junction of branches 12 to 15, inclusive, and are of such dimensions that when the magic-T 11 is observed from any branch, the branch is terminated in its characteristic impedance if the other three branches are terminated in their characteristic impedances. Though matching is preferable, the invention being described does not require that the magic-T be matched, and therefore, the invention is not to be limited to such forms of magic-T. The magic-T of Fig. 1A is disclosed and claimed in the copending application of Robert H. Dicke Serial No. 581,695, filed March 8, 1945.

Referring now particularly to Fig. 1B, there is shown a magic-T 22 in a low-frequency circuit diagram utilizing conventional symbols. This low frequency form of magic-T is equivalent in the results it obtains to the higher frequency form shown in Fig. 1A. As there shown, the magic-T 22 comprises transformers 23 and 24 and terminals 25, 26, 31 and 32. The dots 33 are used to indicate corresponding instantaneous polarity of the windings in transformers 23 and 24.

Referring now jointly to the operation of the magic-T 11 of Fig. 1A and the magic-T 22 of Fig. 1B, it can be shown that they are identical in all respects in the manner of their operation. It will, of course, be obvious to one skilled in the are that the frequencies for which these two magic-T's are designed are different. If energy enters branch 15 or at terminal 32, it will divide equally and arrive at branches 12 and 14 or at terminals 25 and 26 in phase. If branches 12 and 14 or terminals 25 and 26 are terminated in their characteristic impedances, no energy will exist in branch 13 or at terminal 31. Conversely, if equal energies, in phase, enter branches 12 and 14 or terminals 25 and 26, all of this energy will appear in branch 15 or at terminal 32 and none will appear in branch 13 or at terminal 31. If energy enters branch 13 or at terminal 31, it will divide equally and arrive at branches 12 and 14 or at terminals 25 and 26 in 180° phase opposition. If branches 12 and 14 or terminals 25 and 26 are terminated in their characteristic impedance, no energy will exist in branch 15 or at terminal 32. Conversely, if equal energies, in 180° phase opposition, enter branches 12 and 14 or terminals 25 and 26, all of this energy will appear in branch 13 or at terminal 31 and none will appear in branch 15 or at terminal 32. Further, if energy enters branch 12 or 14 or terminal 25 or 26, the energy will divide equally and appear in branches 13 and 15 or at terminals 31 and 32 with no energy appearing in branch 14 or 12 or terminal 26 or 25. In the discussions which follow the term "magic-T" will be taken to include both of the forms shown in Figs. 1A and 1B. The choice of the type to be used in any instance will depend upon the frequency and therefore no limitations will be made concerning the form used. The branches 12 and 14 and terminals 25 and 26 will be referred to as symmetrical terminals. The branches 13 and 15 and terminals 31 and 32 will be referred to as asymmetrical terminals.

Referring now more particularly to Figs. 2A and 2B, there are shown a schematic diagram of a circuit which may be used for either single sideband modulation or demodulation, and a vector analysis showing its operation in one specific case. The circuit comprises a magic-T 41 connected by its symmetrical terminals 42 and 43 to balanced mixers 44 and 45. The mixers 44 and 45 are capable of combining energy of two frequencies to produce energy of frequencies respectively equal to the sum and the difference of the two impressed frequencies. The balanced mixers 44 and 45 are disclosed and claimed in the copending application of Robert H. Dicke, Serial No. 586,413, filed April 3, 1945. Elements 46 and 51 are connected to the asymmetrical terminals 52 and 53 of magic-T 41. The elements 46 and 51 may be sources of radio-frequency energy, amplifiers or other types of loads. A magic-T 54 is connected by its symmetrical terminals 55 and 56 to the balanced mixers 44 and 45. An asymmetrical terminal 61 of magic-T 54 is terminated in a matched load 62. An energy source 63 connects to an asymmetrical terminal 64. The terminals 42, 43, 55 and 56 are separated from the mixers 44 and 45 as shown by electrical distances of $D_1$, $D_2$, $D_3$ and $D_4$. A magic-T 65 is connected by its symmetrical terminals 66 and 71 to mixer 44. One asymmetrical terminal 72 is terminated in a matched load 73 while the other asymmetrical terminal 74 connects to an element 75 through a delay line 76. The element 75 may be an energy source, amplifier or other type of load. The delay line 76 produces an odd number of quarter wavelengths delay in the signal passing through it. A magic-T 81 is connected by its symmetrical terminals 82 and 83 to the balanced mixer 45. One asymmetrical terminal 84 is terminated in a matched load 85 while the other asymmetrical terminal 86 connects to element 75.

In describing the operation of this circuit (Fig. 2A) use will be made of the terms upper and lower sidebands. The upper sideband will be the frequency or frequencies which are the sum of the frequencies impressed on the balanced mixers 44 and 45 while the lower sideband will indicate the difference frequency or frequencies. The apparatus of Fig. 2A may be used in such a manner as to combine two energies, e. g., a local oscillator energy and an intermediate-frequency energy, to produce either the upper or lower sideband or both. Let the electrical distances $D_1$ and $D_2$ differ by an odd number of quarter wavelengths, $D_2$ being the larger, and let $D_3$ and $D_4$ differ by an integral number of wavelengths, which integral number includes zero. Constant reference will be made to Fig. 2B to show the phase relationship of energy waves at various points in the system.

Energy from the local oscillator source 63 enters terminal 64, divides into the left and right terminals 55 and 56 respectively, as viewed in Fig. 2A, and arrives at the mixers 44 and 45 in phase. Referring to Fig. 2B, the relative phase of the energy waves is indicated by vectors 91 and 92. The arrow indicates the direction of rotation and $\omega_c$ indicates the angular velocity of the vectors in each case. Energy from element 75, in this case a source of energy, passes through the magic-T 81 and arrives at the mixer 45 with an instantaneous phase such as represented by vector 93 (Fig. 2B). Energy from element 75 also arrives at the mixer 44 but experiences a quarter wavelength delay or 90° lag. The vector 94 (Fig. 2B) represents this energy. It should be noted that vectors 93 and 94 differ in phase by 90°, with vector 94 lagging. The arrow indicates the direction of rotation and $\omega_f$ indicates the angular velocity of the vectors. The outputs of the mixers 44 and 45 are indicated by vector diagrams 95 and 96 (Fig. 2B). To obtain the graphical position of the upper sideband $(\omega_c+\omega_f)$, the angle $\theta$ or $\theta'$ is added, in the direction of rotation, to the angular position of the vector 91 or 92. To obtain the graphical position of the lower sideband $(\omega_c-\omega_f)$, the angle $\theta$ or $\theta'$ is subtracted, i. e., added in the direction opposite to the direction of rotation, from the position of the vector 91 or 92. The diagrams 101 and 102 indicate the instantaneous phases of the energies at the magic-T 41. As was stated above, the electrical distance $D_2$ exceeds the electrical distance $D_1$ by one-fourth wavelength. The effect of this difference in lengths of paths is indicated by vector diagrams 101 and 102. It should be noted that in the two diagrams, 101 and 102, the upper sidebands in the two cases are in phase, while the lower sidebands in the two cases are in 180° phase opposition. As before mentioned, the properties of the magic-T are such that the upper sideband, equal energies in phase, will enter one asymmetrical terminal, say 53, and pass on to load 51, while the lower sideband, equal energies in 180° phase opposition, will enter the other asymmetrical terminal 52 and pass on to load 46. Either load 46 or 51 may be absorptive and the other an antennae or other device. It will be seen that single sideband modulation has thus been effected without the use of tuned circuits, and separation of the two sidebands will be effected no matter how large or small the modulating frequency may be.

It can be shown that under the same conditions as above, $D_2$ exceeding $D_1$ by one-fourth wavelength and $D_3$ being equal to $D_4$, this same device (Fig. 2A) will work in the opposite direction. If a signal consisting of only the upper sideband relative to the local oscillator frequency i. e., containing only frequencies higher than the local oscillator frequency, or a signal containing both upper and lower sidebands, enters terminal 53 from the source 51, a signal will be produced at 75 which is the effect of only the upper sideband. Likewise, the lower sideband will be selected by the system if energy containing both upper and lower sidebands or only the lower sideband enters terminal 52 from source 46. In general it may be stated that the outlet at which a given sideband appears, when the system is used as a modulator, will select the same sideband when the system is used as a mixer or frequency converter. Hence, the system affords a single sideband mixer circuit which will select either sideband at will. It is to be noted that no matter how close together the upper and lower sideband frequencies are, this system will still differentiate between them. However, it should be noted that where both sidebands are present and it is desired to differentiate between them, the local oscillator must be at a frequency which is the arithmetic mean of the two sideband frequencies.

It can further be shown that if $D_1$ and $D_2$ are made equal and $D_4$ exceeds $D_3$ by an odd number of quarter wavelengths, the system of Fig. 2A may then be used as a single sideband modulator in the same way as described above. However, with this relation between the electrical distances $D_1$, $D_2$, $D_3$ and $D_4$ the outlet at which a given sideband appears, when the system is used as a modulator, selects the other sideband when the system is used as a mixer or frequency converter. A vector analysis similar to that used in a previous paragraph would show this to be true.

The balanced mixers 44 and 45 are used because they give a better signal-to-noise output than the conventional type of mixer. Furthermore, mixers of this type prevent radiation of the local oscillator signal and loss of the received signal in the local oscillator. However, any type of mixer may be used here, and the present disclosure should be so construed. The magic-T's 65 and 81 are used because they minimize the effect of mismatched mixers and aid in general to obtain a well matched system. If other types of mixers are employed, other coupling means will be needed to connect them into the circuit. Therefore, this invention is not limited to their use.

Referring now more particularly to Fig. 3, there is shown a simplified single sideband modulator and demodulator system. This system comprises two mixers 103 and 104 connected to the symmetrical terminals 105 and 106 of a magic-T 111. The mixers 103 and 104 are located at electrical distances $D_1$ and $D_2$, respectively, from the electrical center of the magic-T 111. The distance $D_2$ exceeds the distance $D_1$ by an odd number of eighth wavelengths. A local oscillator source 112 connects to an asymmetrical terminal 113 of the magic-T 111. An element 114 connects to the remaining asymmetrical terminal 115. The element 114 may be a source of radio-frequency energy, an antennae or other load. By means of the delay line 116 the mixers 103 and 104 are separated at the intermediate or modulating frequency by an odd number of quarter wavelengths. The mixer 104 is connected to an element 117 which may be a source of modulating energy, or it may be an intermediate-frequency amplifier or other load.

The system of Fig. 3 may, as has been stated, be used as a single sideband modulator or as a demodulator. By a vector analysis similar to that used in describing the action of the system of Fig. 2A it is possible to show that this is true. When used as a modulator, energy from element 117 is fed to the mixers 103 and 104 where it is combined with energy from the local source 112. The resulting upper and lower sidebands of the energy oscillations pass back to the magic-T 111. It can be shown that the relative phases of the upper and lower sideband frequencies are such that these sidebands will be separated. One of the upper or lower sidebands passes into terminal 115 and to element 114 where it may be utilized. The remaining sideband passes into terminal 113 where it will normally be absorbed by a load (not shown). By use of a directional coupler (not shown) it would be possible to obtain this sideband also.

This system works equally well in the conversion of an upper or lower sideband into an intermediate frequency. In this case the element 114 becomes a source of single or double sideband energy. The upper or lower sideband will be selected, depending upon which would appear in terminal 115 if the system were used as a modulator, and will be combined with energy from the local source 112 to produce intermediate-frequency energy at element 117. If the other sideband is desired, the source 112 and element 114 may be interchanged or a directional coupler (not shown) may be used in conjunction with terminal 113.

While there have been illustrated and described what are at present considered the preferred embodiments of the present invention, it will be obvious to those skilled in the art that various changes and modifications may be made therein without departing from the invention.

I claim:

1. An apparatus for obtaining single sideband modulation comprising first and second balanced mixer means; a first source of energy for producing a radio-frequency carrier; a first magic-T having two symmetrical terminals and two asymmetrical terminals, said first source being connected to one of said asymmetrical terminals of said first magic-T, said two symmetrical terminals of said first magic-T being connected respectively to said first and second mixer means; first matched loading means connected to the remaining of said asymmetrical terminals of said first magic-T; a second magic-T having two symmetrical terminals and two asymmetrical terminals, one of said two symmetrical terminals of said second magic-T being connected to said first mixer means; first delay means connecting the remaining of said two symmetrical terminals of said second magic-T to said second mixer means; a third magic-T having two symmetrical terminals and two asymmetrical terminals, said two symmetrical terminals of said third magic-T being connected to said first mixer means; second matched loading means terminating one of said asymmetrical terminals of said third magic-T; a second source of energy for modulating said carrier; second delay means connecting the remaining of said asymmetrical terminals of said third magic-T to said second source; a fourth magic-T having two symmetrical terminals and two asymmetrical terminals, said two symmetrical terminals of said fourth magic-T being connected to said second mixer means, one of said asymmetrical terminals of said fourth magic-T being connected to said second source; third matched loading means terminating the remaining of said asymmetrical terminals of said fourth magic-T; and fourth and fifth loading means respectively connected to said two asymmetrical terminals of said second magic-T, said fourth and fifth loading means being adapted to utilize the upper and lower sidebands of energy passed through said second magic-T in a desired manner.

2. An apparatus for obtaining single sideband demodulation comprising first and second balanced mixer means; a first source of radio-frequency energy; a first magic-T having two symmetrical terminals and two asymmetrical terminals, said first source being connected to one of said asymmetrical terminals of said first magic-T, said two symmetrical terminals of said first magic-T being connected respectively to said first and second mixer means; first matched loading means connected to the remaining of said asymmetrical terminals of said first magic-T; a second source of radio-frequency energy; a second magic-T having two symmetrical terminals and two asymmetrical terminals, one of said two symmetrical terminals of said second magic-T being connected to said first mixer means, one of said asymmetrical terminals being connected to said second source; first delay means connecting the remaining of said two symmetrical terminals of said second magic-T to said second mixer means; second matched loading means connected to the remaining of said asymmetrical terminals of said second magic-T; a third magic-T having two symmetrical terminals and two asymmetrical terminals, said two symmetrical terminals of said third magic-T being connected to said first mixer means; third matched loading means terminating one of said asymmetrical terminals of said third magic-T; amplifier means; second delay means connecting the remaining of said asymmetrical terminals of said third magic-T to said amplifier means; a fourth magic-T having two symmetrical terminals and two asymmetrical terminals, said two symmetrical terminals of said fourth magic-T being connected to said second mixer means, one of said asymmetrical terminals of said fourth magic-T being connected to said amplifier means; and fourth matched loading means terminating the remaining of said asymmetrical terminals of said fourth magic-T.

3. An apparatus for obtaining single sideband modulation comprising first and second mixer means; a magic-T having two symmetrical terminals and two asymmetrical terminals, one of said two symmetrical terminals of said magic-T being connected to said first mixer means; first delay means connecting the remaining of said two symmetrical terminals of said magic-T to said second mixer means; a first source of energy for producing a radio-frequency carrier, said first source being connected to one of said asymmetrical terminals of said magic-T; first loading means associated with said first source to absorb the undesired sideband; second loading means connected to the remaining of said asymmetrical terminals of said magic-T; a second source of energy connected to said second mixer means; and second delay means connecting said second source to said first mixer means.

4. An apparatus for obtaining single sideband demodulation comprising first and second mixer means; a magic-T having two symmetrical terminals and two asymmetrical terminals, one of said two symmetrical terminals of said magic-T being connected to said first mixer means; first delay means connecting the remaining of said two symmetrical terminals of said magic-T to said second mixer means; a first source of radio-frequency energy connected to one of said asymmetrical terminals of said magic-T; a second source of radio-frequency energy connected to the remaining of said asymmetrical terminals of said magic-T; amplifier means connected to said second mixer means; and second delay means connecting said amplifier means to said first mixer means.

5. An apparatus for obtaining single sideband modulation comprising first and second mixer means; a first source of radio-frequency energy; a first magic-T having two symmetrical terminals and two asymmetrical terminals, said first source being connected to one of said asymmetrical terminals of said first magic-T, said two symmetrical terminals of said first magic-T being respectively connected to said first and second mixer means; first matched loading means connected to the remaining of said asymmetrical terminals of said first magic-T; a second magic-T having two symmetrical terminals and two asymmetrical terminals, one of said two symmetrical terminals of said second magic-T being connected to said first mixer means; first delay means connecting the remaining of said two symmetrical terminals of said second magic-T to said second mixer means; a second source of energy connected to said second mixer; second delay means connecting said first mixer means to said second source; and second and third loading means respectively connected to said two asymmetrical terminals of said second magic-T, said second and third loading means being adapted to utilize the upper and lower sideband energies in the desired manner.

6. An apparatus for obtaining single sideband demodulation comprising first and second mixer means; a first source of radio-frequency energy; a first magic-T having two symmetrical terminals and two asymmetrical terminals, said first source being connected to one of said asymmetrical terminals of said first magic-T, said two symmetrical terminals of said first magic-T being connected respectively to said first and second mixer means; first matched loading means connected to the remaining of said asymmetrical terminals of said first magic-T; a second source of radio-frequency energy; a second magic-T having two symmetrical terminals and two asymmetrical terminals, one of said two symmetrical terminals of said second magic-T being connected to said first mixer means, one of said asymmetrical terminals of said second magic-T being connected to said second source; first delay means connecting the remaining of said two symmetrical terminals of said second magic-T to said second mixer means; second loading means connected to the remaining of said asymmetrical terminals of said second magic-T; amplifier means connected to said second mixer; and second delay means connecting said first mixer to said amplifier means.

7. An apparatus for obtaining single sideband modulation comprising first and second balanced mixer means; a first source of radio-frequency energy; a first magic-T having two symmetrical terminals, and two asymmetrical terminals, said first source being connected to one of said asymmetrical terminals of said first magic-T, one of said two symmetrical terminals of said first magic-T being connected to said first mixer means; first matched loading means connected to the remaining of said asymmetrical terminals of said first magic-T; first delay means connecting said second mixer to the remaining of said symmetrical terminals of said first magic-T; a second magic-T having two symmetrical terminals and two asymmetrical terminals, said two symmetrical terminals of said second magic-T being connected respectively to said first and second mixer means; a second source of energy connected to said second mixer; second delay means connecting said first mixer means to said second source; and second and third loading means connected to said two asymmetrical terminals of said second magic-T, said second and third loading means being adapted to utilize the upper and lower sideband energies in the desired manner.

8. An apparatus for obtaining single sideband demodulation comprising first and second mixer means; a first source of radio-frequency energy; a first magic-T having two symmetrical terminals and two asymmetrical terminals, said first source being connected to one of said asymmetrical terminals of said first magic-T, one of said two symmetrical terminals of said first magic-T being connected to said first mixer means; first matched loading means connected to the remaining of said asymmetrical terminals of said first magic-T; first delay means connecting said second mixer to the remaining of said symmetrical terminals of said first magic-T; a second source of radio frequency energy; a second magic-T having two symmetrical terminals and two asymmetrical terminals, said two symmetrical terminals of said second magic-T being connected respectively to said first and second mixer means; second loading means connected to the remaining of said asymmetrical terminals of said second magic-T; amplifier means connected to said second mixer; and second delay means connecting said first mixer to said amplifier means.

9. An apparatus for obtaining single sideband modulation comprising a magic-T waveguide balanced mixer having two asymmetrical branches and two symmetrical branches, a first source of radio frequency energy connected to one of said asymmetrical branches, loading means connected to the other of said asymmetrical branches, a first mixer means located in one of said symmetrical branches at a predetermined distance from the junction of said symmetrical branches, a second mixer means located in the other of said symmetrical branches at a distance from said junction differing from said predetermined distance by an eighth of a wavelength, a source of low frequency energy connected to one of said symmetrical branches, and delay means connecting said low frequency source to the other of said symmetrical branches.

ROBERT H. DICKE.

REFERENCES CITED

The following references are of record in the file of this patent:

UNITED STATES PATENTS

| Number | Name | Date |
|---|---|---|
| 1,831,516 | Stewart | Nov. 10, 1931 |